United States Patent [19]
Farrell

[11] Patent Number: 4,999,396
[45] Date of Patent: Mar. 12, 1991

[54] METHOD FOR MAKING LOW RESIN CONTENT POLYMER CONCRETE

[76] Inventor: Larry J. Farrell, 675 Grove Ter., Elk Grove, Ill. 60007

[21] Appl. No.: 276,266

[22] Filed: Nov. 25, 1988

[51] Int. Cl.$^5$ .................. C08K 3/00; C04B 26/04; C04B 40/00
[52] U.S. Cl. ..................................... 524/650; 106/648
[58] Field of Search ............... 523/340; 524/538, 650, 524/554, 594, 5; 106/90

[56] References Cited

U.S. PATENT DOCUMENTS 4,268,657 5/1981 Manzara .............................. 524/594
4,346,050 8/1982 Trent et al. .

FOREIGN PATENT DOCUMENTS 0791686 1/1980 U.S.S.R. .............................. 523/340

Primary Examiner—Joseph L. Schofer
Assistant Examiner—Tom Weber
Attorney, Agent, or Firm—Thomas R. Vigil

[57] ABSTRACT

The method for making a low resin content polymer concrete article includes the steps of: supplying a quantity of polymer or monomer resin; adding a non-reactive solvent, vehicle, dispersant or diluent to the resin; supplying the mixture of diluent and resin to a mixing station; supplying filler material to the mixing station; mixing the diluent, resin and filler material at the mixing station; supplying the resultant mixture to an eduction chamber; educing the non-reactive diluent from the eduction chamber; and supplying the resulting mixture with diluent educed to a forming station for shaping and curing.

12 Claims, 1 Drawing Sheet

METHOD FOR MAKING LOW RESIN CONTENT POLYMER CONCRETE

BACKGROUND OF THE INVENTION

1. Field of the Invention

The present invention relates to a method and apparatus for making a composite, such as a polymer concrete wherein the concrete has a low percentage of resin therein, such as below ten percent (10%) by weight resin.

2. Description of the Prior Art

Heretofore it has been known in the production of composite articles, which are defined as articles made from a filler material, e.g., a particulate material, and a binder such as cement and water or a liquid thermosetting resin, that polymer concrete articles such as those made using a polymer or monomer resin as a binder have desirable properties, particularly high strength over cement based concrete articles.

However, the cost of the polymer or monomer resin relative to the particulate material is very high and typically the amount of polymer in a polymer concrete article costs twenty times more than the particulate material or aggregate in the polymer concrete article. As a result, the cost of polymer concrete articles has prevented more widespread use of polymer concrete articles.

With present manufacturing methods and apparatus for the manufacture of polymer concrete articles, it is very difficult to manufacture a concrete article with less than ten percent (10%) by weight resin in the article if the filler mix contains many fine particles.

The problem is that when the amount of the binder, e.g., resin, is very low, it is very difficult to mix the binder with the particulate material or aggregate because there is insufficient liquid to wet the surface of the particles of the filler mixture. An analogy would be the mixing of pancake mix, which calls for one cup of water, with one teaspoon of water. It may be possible eventually to obtain substantial mixing and partial or sufficient wetting throughout the mixture but it will take a long time to effect such mixing.

Thus, prior attempts to produce polymer concrete articles with a low percentage of resin have been self-defeating since, to obtain the low resin polymer concrete article, one had to spend several hours mixing the low content resin with the particulate matter prior to casting, heating, if necessary, and setting, polymerization, gelling or curing of the thermosetting resin based polymer concrete material.

Examples of methods and apparatus for producing polymer concrete are disclosed in German Offenlugungsschrift 32 07 432; and, 36 37 755. The polymer concrete machines disclosed in these Published German patent applications are manufactured by Respecta Baumaschinen-Gesellschaft MBH of Dusseldorf, West Germany.

Furthermore, process for casting products having a thermosetting resin binder therein are disclosed in U.S. Pat. Nos. 4,473,673 and 4,652,596.

Also, it is known from U.S. Pat. No. 3,633,880 to place a vacuum on an extrusion device for venting volatile elements from an extrudate.

Additionaly, polymer concrete systems have been proposed wherein a low resin percentage is obtained in the polymer concrete product by a method of over vibration of a mold filled with a mixture of resin and filler causing filler particles to settle to the bottom of the mold thereby displacing some of the resin binder which forms a resin-rich layer at the top of the mold cavity, after the resin has set (polymerized). This resin rich layer is then cut off and thrown away thereby wasting the excess resin required for mixing.

As will be described in greater detail hereinafter, the method and apparatus of the present invention provide a solution to the problem of obtaining a low cost polymer concrete article having a low percentage by weight of resin binder therein. As will be described in greater detail hereinafter, this is achieved by first mixing a quantity of resin binder with a non-reactive diluent. Then, the resulting liquid comprising diluent and resin is mixed with particulate material/aggregate, which can be, for example, sand and gravel. A catalyst can be added and the mixture is then thoroughly mixed and passed into an eduction chamber. The eduction chamber can include a screw type agitator which moves the mixture through the chamber while heat is supplied to the chamber and/or a vacuum is placed on the chamber to withdraw volatilized diluent This is done prior to supplying the mixture to a mold or forming station. Then, the mixture is supplied to a forming station where an article is shaped, formed or molded and more heat can be applied to the mixture to heat it to the setting temperature determined by the resin and catalyst mixture, which is greater than the temperature of any heat supplied to the education chamber.

SUMMARY OF THE INVENTION

According to the present invention there is provided a method for making a low resin content polymer concrete article including the steps of: supplying a quantity of polymer or monomer resin; adding a non-reactive solvent, dispersant, vehicle or diluent to the resin; supplying the mixture of diluent and resin to a mixing station; supplying filler material to the mixing station; mixing the diluent, resin and filler material at the mixing station; supplying the resultant mixture to an eduction chamber; educing the non-reactive diluent from the mixture in the eduction chamber; and supplying the resulting mixture with diluent educed to a forming station for shaping and curing.

DESCRIPTION OF THE PREFERRED EMBODIMENT(S)

Figure 1:
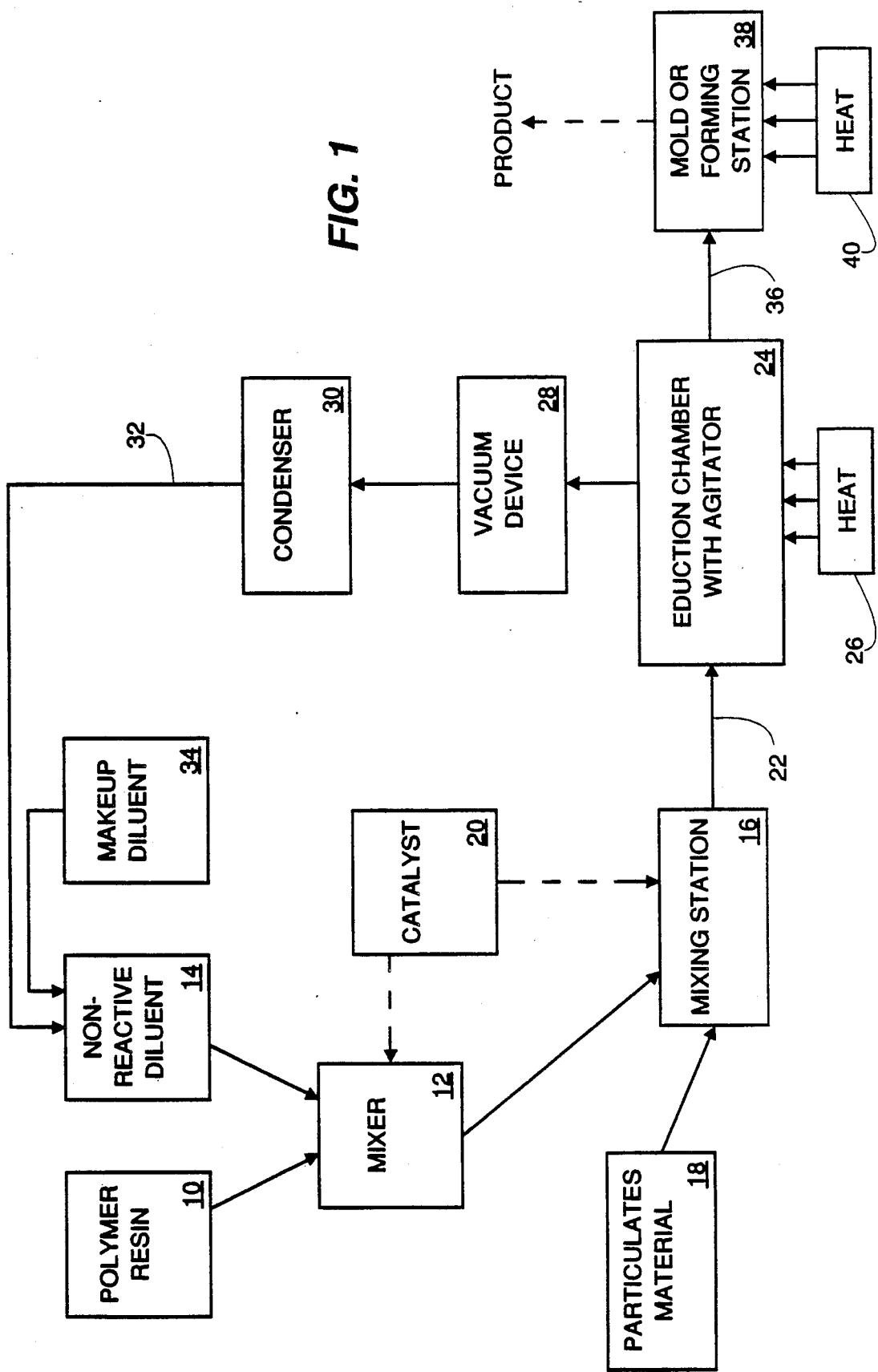
FIG. 1 is a block schematic diagram illustrating the steps of the method and the components of the apparatus for carrying out the method.

Referring to FIG. the single Figure of the drawings, there is illustrated therein a block schematic diagram of a method of, or an apparatus for carrying out the method of, the present invention. Here it will be seen that a source 10 of polymer or monomer resin is provided which is supplied to a first mixing station 12 which can be an inline, static or dynamic mixer 12. A source 14 of dispersant, vehicle, solvent, or diluent (hereinafter diluent) which is non-reactive with the resin is provided and supplies diluent to the mixer 12.

The thermosetting polymer or monomer resin supplied from the source 10 can be a furfural alcohol, an epoxy, an acrylic, a polyurethane or an unsaturated polyester. Typically, the polymer resin will be an unsaturated polyester due to its low cost.

The dispersant, vehicle, solvent or diluent can be acetone, methylene chloride, or 1, 1, 1, trichloroethane for a polyester.

The diluted resin liquid mixture is supplied to a second mixing station 16. At the same time, filler material is supplied from a source 18 of filler material, such as a particulate material to the second mixing station 16 and a catalyst from a catalyst source 20 is supplied either to the diluted resin at the first mixing station 12 or to the second mixing station 16. A typical catalyst which can be used for an unsaturated polyester resin is MEKP (methyl ethyl keytone peroxide).

If desired, an accelerator can be added to the mixture at the second mixing station 16.

At the second mixing station 16, the liquid diluted resin is easily mixed with the particulate material since sufficient liquid is provided in the mixture of resin and diluent to enable sufficient wetting of the particulate material which can be sand, gravel, calcium carbonate, ATH, quartz, granite, slate or any other filler material such as ground glass or other waste material (hazardous or non-hazardous).

The diluted resin and particulate material can be mixed in batches at the mixing station 16 or in a continuous online mixer.

The resulting mixture is supplied via a feedline 22 to an eduction chamber 24 having an agitator. One typical realization of the eduction chamber 24 would be a barrel having a driven screw therein of the type disclosed in German Offenlegungsschrift 36 37 755 or in U.S. Pat. No. 4,652,596.

Dependent upon the diluent chosen and its vapor point, an adjustable source 26 of heat can be provided whereby the incoming material moved by a screw agitator, for example, can be exposed to a gradual increasing temperature as the mixture is moved through the eduction chamber 24.

Alternatively or simultaneously, a vacuum is drawn by a vacuum device 28 on the eduction chamber 24 to educe the volatilized diluent (which is volatilized by the heat, by the vacuum or by a combination of the vacuum and the heat) from the chamber 24. The volatilized diluent that is drawn off from the eduction chamber 24 is then supplied to a condenser 30 where it is condensed back to a liquid and returned via line 32 to the source 14 of non-reactive diluent. Since there may be some losses in diluent, a source 34 of makeup diluent is provided and coupled to the diluent source 10 for supplying makeup diluent.

It is to be understood that the temperature from the heat source 26 supplied to the induction chamber will be less than the setting, gelling, polymerization or curing temperature of the resin and catalyst.

After the diluent has been drawn off in the eduction chamber, the resulting mixture is fed via a feedline 36 to a mold or forming station 38 where it is cast, extruded, compression molded or otherwise formed. If needed, heat can be supplied from a heat source 40 to the forming station 38 to cause the resultant product to set thereby to produce a polymer concrete article having a low percentage of resin.

It is to be understood that other catalysts besides MEKP can be used, such as for example BPO, AAP, and CHP, as is well known in the field of thermosetting polyester resins.

In the practice of the method disclosed herein, it is important that a non-reactive, dispersant, vehicle, solvent or diluent be utilized so that there is no reaction with the resin.

Also, it is important that the non-reactive solvent, vehicle dispersant or diluent be removed, such as with use of the eduction chamber 24, before final shaping, gelling or curing of the resultant mixture to form a polymer concrete article.

By preparing a mixture of diluted polymer or monomer resin and filler material, such as a particulate material, according to the method described above, it has been found that low cost polymer concrete products, articles or mixtures can be obtained having a very low resin content. More specifically, a concrete product having below ten percent (10%) by weight resin content can be obtained using the method and apparatus described herein.

However, in some instances, depending upon the aggregate or particulate material utilized, voids are incurred in the resulting product due to the low resin content. Nonetheless, in many applications, the presence of such voids in the resulting product is not detrimental to the manufacture, sale or use of the resulting polymer concrete product.

From the foregoing description, it will be apparent that the method and apparatus of the present invention have a number of advantages, some of which have been described above and others of which are inherent in the invention Also, modifications can be made to the method and apparatus of the present invention without departing from the teachings of the invention Accordingly, the scope of the invention is only to be limited as necessitated by the accompanying claims.

I claim:

1. A method for making a low resin content polymer concrete article including the steps of:
   supplying a quantity of polymer or monomer resin;
   adding a non-reactive solvent, vehicle, dispersant or diluent to the resin;
   supplying the mixture of diluent and resin to a mixing station;
   supplying filler material to the mixing station;
   mixing the diluent, resin and filler material at the mixing station;
   supplying the resultant mixture to an eduction chamber;
   educing the non-reactive diluent from the mixture in the eduction chamber; and
   supplying the resulting mixture with diluent educed to a forming station for shaping and curing.

2. The method of claim 1 including the further step of supplying heat to the eduction chamber to induce volatilization of (drive off) the diluent.

3. The method of claim 2 wherein the temperature of the heat supplied to the eduction chamber is less than the curing temperature of the resulting mixture.

4. The method of claim 1 including the step of applying a vacuum to the eduction chamber to volatize and draw off the volatilized diluent.

5. The method of claim 1 including the steps of: supplying heat to the eduction chamber to induce volatilization of (drive off) the diluent; and applying a vacuum to the eduction chamber to volatilize and draw off the volatilized diluent.

6. The method of claim 1 including the step of condensing the volatilized diluent that is drawn off from the eduction chamber and recirculating the condensed diluent back to the source of non-reactive diluent.

7. The method of claim 1 including the step of adding a catalyst to the mixture of diluent and resin.

8. The method of claim 1 including the step of adding a catalyst to the mixture of diluent, resin and filler material being mixed at the mixing station.

9. The method of claim 1 including the step of moving the resultant mixture through the eduction chamber.

10. The method of claim 1 including the step of agitating the resultant mixture in the eduction chamber.

11. The method of claim 1 including the step of agitating the resultant mixture while moving the mixture through the eduction chamber.

12. A method for making a low resin content polymer concrete article having less than 10% by weight resin, said method including the steps of:

supplying a quantity of polymer or monomer resin;

adding a non-reactive solvent, vehicle, dispersant or diluent to the resin;

supplying the mixture of diluent and resin to a mixing station;

supplying filler material to the mixing station;

mixing the diluent, resin and filler material at the mixing station;

supplying the resultant mixture to an eduction chamber;

educing the non-reactive diluent from the mixture in the education chamber; and supplying the resulting mixture with diluent educed to a forming station for shaping and curing.

* * * * *